United States Patent Office 3,518,436
Patented June 30, 1970

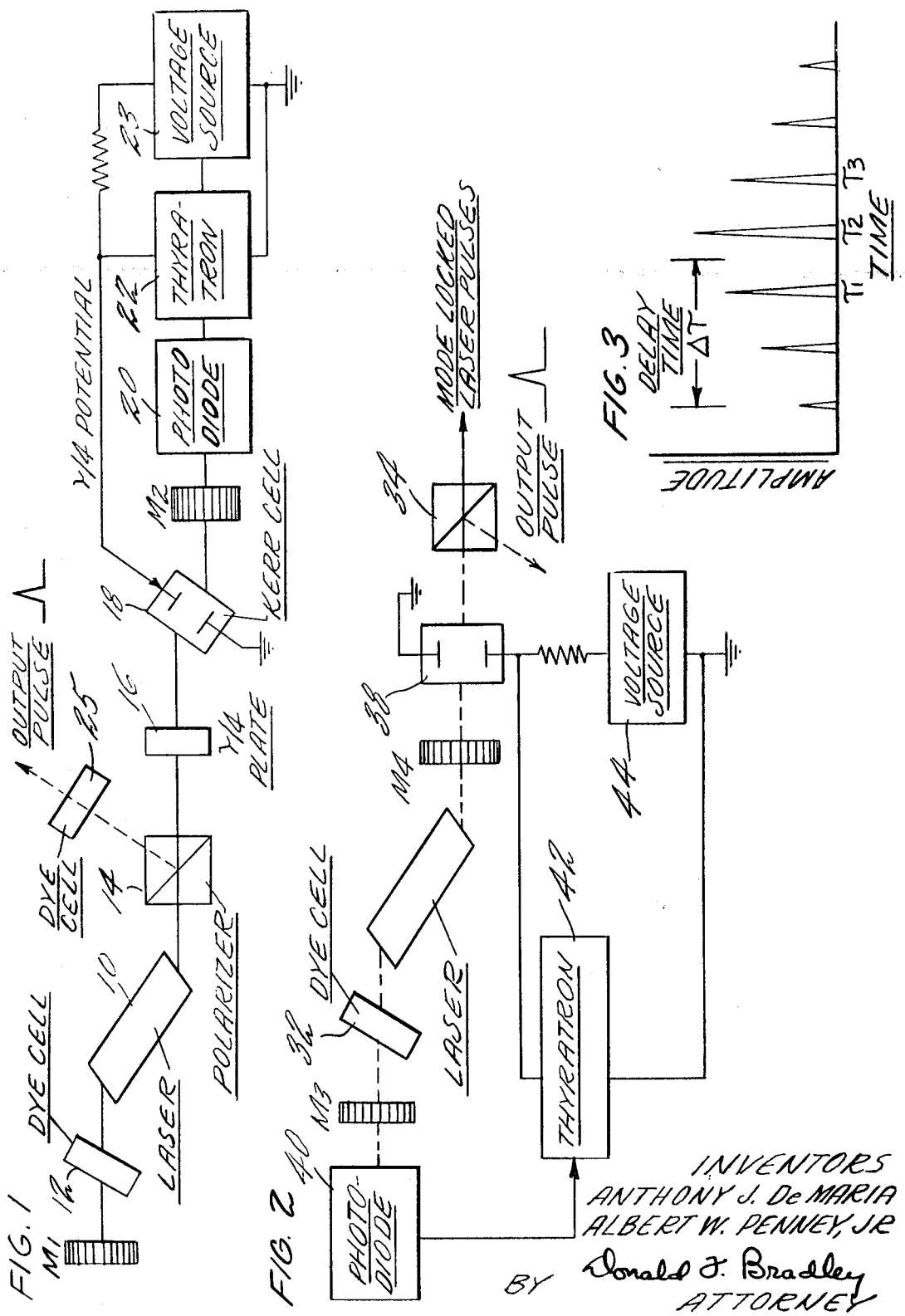

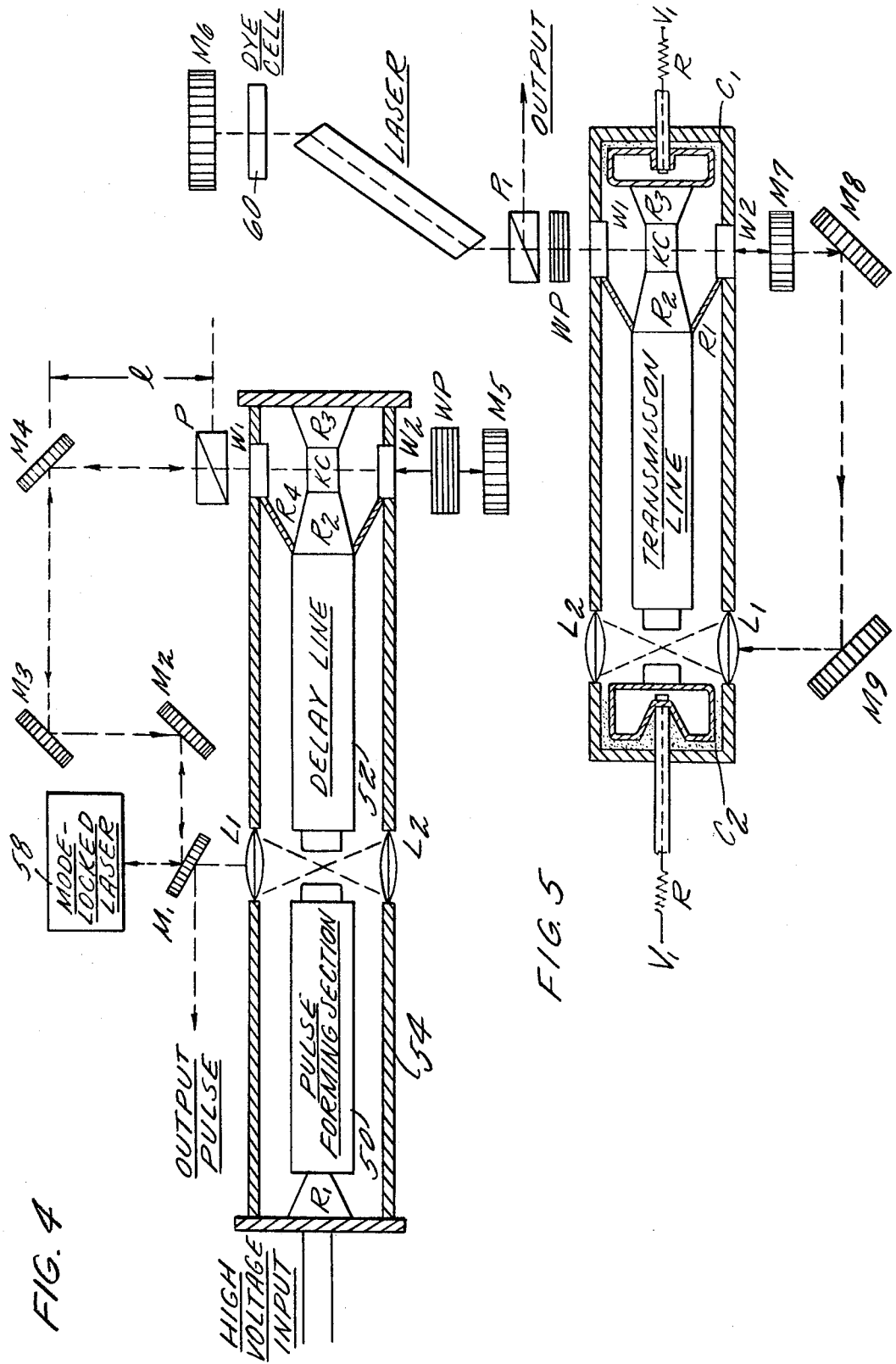

3,518,436
LASER PULSE GENERATOR USING MARX-BANK PULSER
Anthony J. De Maria, West Hartford, and Albert W. Penney, Jr., Glastonbury, Conn., assignors to United Aircraft Corporation, East Hartford, Conn., a corporation of Delaware
Filed Sept. 29, 1967, Ser. No. 671,761
Int. Cl. H04b 9/00
U.S. Cl. 250—199                                                        4 Claims

ABSTRACT OF THE DISCLOSURE

Apparatus for generating a single, high power laser pulse having time durations as short as $10^{-13}$ seconds or less in which a fast shutter such as a Kerr cell is inserted in the path of the laser beam, either inside or outside the laser feedback cavity. The laser is simultaneously mode-locked and Q-switched to generate a series of equally spaced pulses. One of the laser pulses is used to trigger the shutter to either open or close it, depending on the configuration, for a time period sufficient to pass only one of the laser pulses from the output of the apparatus.

A specific embodiment uses a transmission line pulse generator having a spark gap triggered by one of the laser pulses to trigger the shutter.

Another specific embodiment uses an optically triggered Marx-Bank pulser to trigger the optical shutter.

BACKGROUND OF THE INVENTION

This invention relates to lasers, and particularly to apparatus for obtaining a single high peak power laser pulse of time duration in the order of $10^{-9}$ to $10^{-13}$ seconds.

Short duration pulses up to $10^{-8}$ seconds in width and of peak powers up to several billion watts have been generated by inserting a fast shutter between a laser and one of its reflectors. When the shutter is closed, excitation of the laser can be built up far beyond its normal threshold and a high excitation is reached. When the shutter is opened, the radiation builds up rapidly and all the excess excitation is discharged in an extremely short burst. Such pulses have found extremely wide usage, for example, in studying gas breakdown at optical frequencies, non-linear optical effects, and surface emission effects, as well as military usage in guidance, ranging and photography.

However, the minimum pulse widths obtainable with existing techniques are limited to approximately $10^{-8}$ seconds as a result of the requirement that the laser pulse pass through the laser medium more than once in order to build up the pulse.

It is apparent that there are numerous applications for single, high peak power, Q-switched optical pulses of time durations in the range of $10^{-9}$ to $10^{-13}$ seconds in both industry and the military. For example, the use of an optical pulse of $10^{-10}$ seconds time duration would enable the measurement of distance of a few miles to an accuracy of several centimeters.
which is short compared with the transit time of radiation To accomplish the generation of such narrow pulses, it is necessary to activate an optical shutter in a time generated by a simultaneously Q-switched and mode-locked laser. The optical shutter, which is preferably a Kerr or Pockel cell, is positioned in the path of the laser pulses. A detector is also positioned to respond to the laser pulses, and when the amplitude of the laser pulses achieves a predetermined magnitude, the Kerr cell is actuated for a time sufficient to pass one of the laser pulses.

Various configurations of the invention are described in which the Kerr cell may be positioned either inside or outside the optical feedback cavity of the laser. Further, the Kerr cell may be opened to pass a single laser pulse, or closed whereby a single laser pulse is reflected out of the laser cavity. The Kerr cell may also be opened for a time sufficient to pass two or more laser pulses if desired.

In a specific embodiment, an optically triggered transmission line pulse generator is used to trigger the Kerr cell.

In another embodiment, a Marx-Bank pulse generator is used to trigger the Kerr cell.

It is therefore an object of this invention to provide a system for obtaining a single high-power laser pulse of time duration of $10^{-9}$ to $10^{-13}$ seconds.

Another object of this invention is the use of an optical shutter to pass a preselected number of one or more pulses from a train of mode-locked and Q-switched laser pulses.

A further object of this invention is a fast optical shutter actuated by a train of laser pulses for producing a preselected number of one or more laser pulses.

Another object of this invention is a transmission line pulse generator triggered by a train of laser pulses for actuating an optical shutter.

A still further object of this invention is a Marx-Bank pulse generator triggered by a train of laser pulses for actuating an optical shutter.

BRIEF DESCRIPTION OF THE DRAWINGS

FIG. 1 is a schematic diagram of the apparatus for obtaining a single high power laser pulse in which the optical shutter is within the laser cavity.

FIG. 2 is a schematic diagram of a modification of FIG. 1 in which the optical shutter is outside the cavity.

FIG. 3 shows typical mode-locked output pulses from a laser.

FIG. 4 shows schematically an optically triggered transmission line pulse generator to actuate an optical shutter outside the laser cavity.

FIG. 5 is a schematic diagram of a modification of FIG. 4 in which the optical shutter is inside the cavity.

DESCRIPTION OF THE PREFERRED EMBODIMENT

Figures 6, 7:
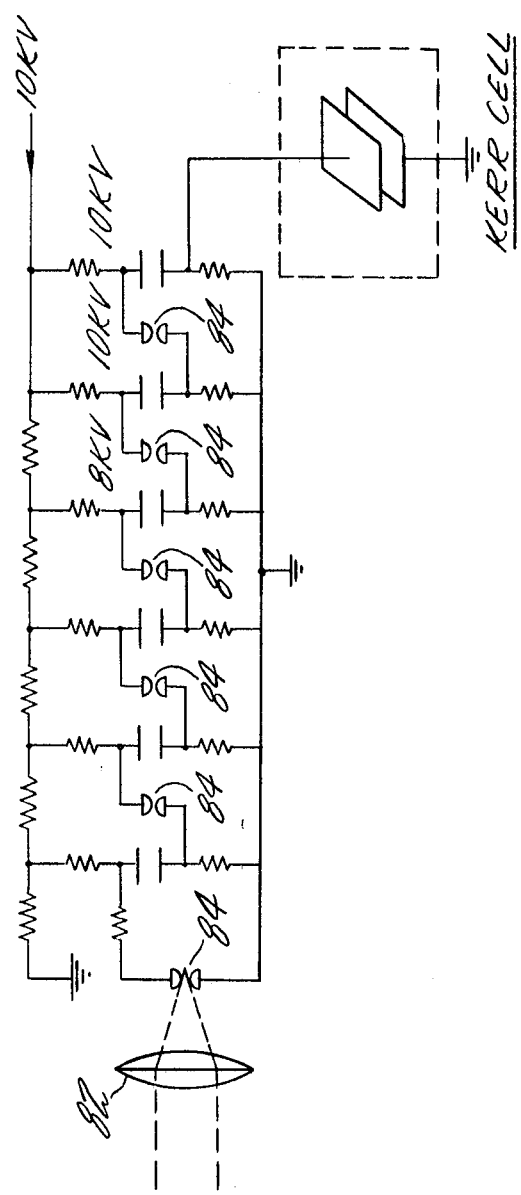
FIG. 6 shows schematically another embodiment of the invention utilizing a Marx-Bank pulser to trigger an optical shutter.
FIG. 7 shows the Marx-Bank pulser of FIG. 6.

A train of very narrow laser pulses of high peak powers may be obtained by mode-locking a laser. Mode-locking may be achieved in two ways: first, by inserting a time varying loss modulator within the laser's optical feedback cavity, the modulator having a frequency commensurate with the frequency separation of the axial modes of the laser; or, second, by the optical expandor element behavior of saturable absorbers having a recovery time shorter than the transit time required for an optical pulse to make one round trip between the two laser reflectors, the expandor element being inserted in the optical feedback path of the laser.

The time varying loss modulator is described in U.S. Pat. 3,297,876 entitled "Amplitude Modulation for Lasers" by Anthony J. De Maria, and the saturable absorbers is described and claimed in copending application Ser. No. 536,898 entitled "Self-Mode Locking of Lasers Using Dyes" filed Mar. 23, 1966 by Anthony J. De Maria et al., both of which are assigned to the same assignee as is this application.

The output from a mode-locked laser consists of a series of pulses separated in time by the round trip transit time of the optical feedback cavity, and with pulses widths inversely proportional to the number of axial modes locked in synchronism. In this application the use of saturable absorbers for mode-locking will be employed as examples, recognizing that the use of a loss modulator is not excluded.

It is also known by use of the pulse transmission mode that the peak power output from a laser cavity may be enhanced providing the feedback cavity is short, high reflectivity mirrors are used, and an optical shutter or electro-optic element such as a Kerr cell in the cavity can be activated in a time which is short compared with the cavity transit time. See, for example, the article by A. A. Vuylsteke in the Journal of Applied Physics, vol. 34, p. 1613 (1963). However, until this invention the problem of activating a Kerr cell in the required short time has not been solved. In addition, the pulse widths obtainable from prior art pulse transmission mode systems can never be shorter than the round trip transit time of the cavity, while this invention enables one to obtain optical pulses having widths much shorter than the transit time of the laser cavity.

Referring particularly to FIG. 1, a laser rod 10 which for example, may be $Nd^{3+}$-doped glass, has its ends polished at Brewster's angle, and is inserted in an optical feedback cavity consisting of mirrors $M_1$ and $M_2$ which are dielectric coated for example, to 95% and 99% reflectivity respectively. The mirrors of the laser cavity are spaced to produce a round trip transit time of an optical pulse which is longer than the time required to short out the $\lambda/4$ voltage normally maintained on the Kerr cell. In our experiments, this value was typically of $16 \times 10^{-9}$ sec.

A dye cell 12 is filled with a reversible dye solution such as Eastman 9740 when a $Nd^{3+}$-glass is used, and is positioned in the cavity as shown to provide self-mode locking for the laser output. A polarizer 14 is also inserted in the feedback cavity, together with a Kerr cell 18. Pumping apparatus such as a flash lamp and power supplies are required but not shown. A quarter-wave ($\lambda/4$) plate 16 may also be inserted in the feedback cavity, but will not be required if a half-wave ($\lambda/2$) voltage is applied to the Kerr cell 18 as will be described.

Positioned adjacent output mirror $M_2$ is a photodiode 20, a commercially available type having a fast response time, and the output of the photodiode is fed to a thyratron 22 capable of high voltage operation and minimum anode delay time. The output of the thyratron is fed back to switch Kerr cell 18 as will be described.

The faces of all elements in the feedback cavity should be either antireflection coated or oriented at Brewster's angle.

Initially a voltage is maintained on the Kerr cell 18 by the voltage source 23 which biases the Kerr cell to its quarter-wave voltage, and the quarter-wave plate 16 is adjusted to give maximum transmission for a zero concentration of dye in cell 12. At this point the cavity is in a high-Q condition so long as the quarter-wave potential is across the Kerr cell, and is in a low-Q condition if the Kerr cell bias is removed.

Dye is then added to dye cell 12 until the optical density required for self-mode-locked Q-switching, with the quarter-wave potential continuously applied to the Kerr cell, is obtained. The laser 10 is then actuated by turning on the pumping apparatus, and as a result of the dye cell 12 simultaneous Q-switching and mode-locking of the laser is initiated. A pulse of radiation bounces back and forth between mirrors $M_1$ and $M_2$. This pulse increases in peak power on each pass through the laser rod. A portion of this pulse passes through mirror $M_2$ and resembles the pulses indicated by FIG. 3. These pulses fall on photodiode 20. An early pulse at time $T_0$ triggers thyratron 22. After some delay time $\Delta\tau$ the thyratron shorts out the potential which has been applied across Kerr cell 18. When this occurs, the laser pulse which is passed to the right by polarizer 14 through quarter-wave plate 16 and Kerr cell 18 will now return polarized at 90° relative to its initial polarization rather than 180°, and hence will be totally reflected out of the laser cavity by the polarizer. In this manner, for a switch of the cavity Q faster than the optical round trip transit time of the cavity, almost all of the energy stored in the feedback cavity will be ejected and no succeeding pulses will be possible because the thyratron will hold the overall Q of the feedback cavity to a low value for the remainder of the optical pumping. The delay time $\Delta\tau$ can be adjusted by adding time delay between photodiode 20 and thyratron 22 so as to eject the pulse when it has a maximum peak power. A dye cell 25 similar to dye cell 12 may be positioned in the path of the output pulse in order to pass the output pulse relatively unattenuated while absorbing the low-level background pulse due to the scattering of radiation in the output polarization by imperfections in the various optical elements in the cavity, the nonuniform electric-field distribution across the aperture of the Kerr cell, and the switching time of the Kerr-cell circuit.

The length of the laser feedback cavity is a compromise between ease of alignment and a high probability of selecting a single output pulse as a result of the requirement that the switching time of the Kerr cell be faster than the optical transit time of the cavity. In the case of the apparatus described previously, the Kerr cell switching time is somewhat shorter than the round trip cavity transit time of 16 nanoseconds. This switching time produces a single output pulse approximately 75% of the time. Using the above described configuration, single pulses of 0.2 joule and 0.8 nanosecond half-amplitude duration have been obtained.

FIG. 2 shows a modification of the system of FIG. 1 in which the optical shutter, i.e. the Kerr cell, is positioned outside the laser feedback cavity. The laser 30 is inserted in a feedback cavity comprising mirrors $M_3$ and $M_4$. A dye cell 32 is positioned in the cavity as previously. Outside the cavity but in the path of the laser beam is a polarizer 34 and a Kerr cell 38. Adjacent mirror $M_3$ and also in line with the laser beam at the other side of the cavity is an output detector such as photodiode 40. The output of the photodiode is fed to a thyratron 42 as described previously. A voltage source 44 maintains the Kerr cell 38 biased to its full-wave voltage. By making the reflectivity of $M_4$ less than $M_3$, the major output of the laser is to the right of $M_4$. The output from the right end of the laser through the Kerr cell 38 and polarizer 34 constitutes the laser's simultaneously mode-locked and Q-switched output. The small output from the left end of the laser is allowed to proceed through mirror $M_3$ and impinge on photodiode 40. An early pulse occurring at time $\tau_0$ (see FIG. 3) triggers thyratron 42. After some time delay $\Delta\tau$, the thyratron shorts out the potential applied across Kerr cell 38. The polarization of the pulse occurring at time $\tau$, is now rotated 90° with respect to the previous pulses. The polarizer 34 ejects the pulse occurring at time $\tau_1$. As a consequence this pulse does not appear in the series pulses to the right of polarizer 34. If the voltage is reapplied to the Kerr cell after time $\tau_1$, the subsequent pulses pass through polarizer 34. The time during which the potential across Kerr cell 38 is shorted out by the thyratron 42 can be made as large as one chooses, and one, two or more pulses can be ejected from the pulse train by this arrangement.

The distance between mirrors $M_3$ and $M_4$ is chosen so as to have the mode-locked pulse repetition rate longer than the opening and closing time of Kerr cell 38. Before the occurrence of the next laser mode-locked pulse, the Kerr cell is fully opened and the next laser pulse proceeds through the shutter of the Kerr cell. If only one output pulse is desired, the shutter of the Kerr cell can be allowed to close by the time of the occurrence of the next laser pulse, thereby preventing the passage of additional pulses. The time interval can typically be anywhere from 2 to $30 \times 10^{-9}$ seconds.

It is obvious to those skilled in the art that the Kerr cells of FIGS. 1 and 2 may be replaced by Pockel cells with a corresponding adjustment in the amplitude and polarity of the cell opening and closing signals.

FIG. 3 shows a series of normal mode-locked output pulses from a laser such as occur in FIGS. 1 and 2. The delay time $\Delta \tau$ may be chosen so that the Kerr cell opens after the pulse occurring at time $\tau_1$, thereby ejecting the pulse having the largest amplitude, i.e. the pulse occurring at $\tau_2$. The pulse at time $\tau_2$ thereupon passes through the Kerr cell. By time $\tau_3$, the Kerr cell is closed preventing the passage of additional pulses. As a result only the pulse occurring at time $\tau_2$ passes through to the output.

FIGS. 4 and 5 show how a single narrow laser pulse may be produced by the use of an optically triggered transmission line pulse generator used to trigger a Kerr cell in the optically biased pulse transmission mode. The transmission line pulser can generate up to 20 to 40 kilovolt pulses of 20 nanosecond time duration and 1 to 2 nanosecond rise and fall times.

Recent work has proven that it is possible to trigger a spark gap with a mode-locked laser pulse and have a delay time of considerably less than 10 nanoseconds since the rise time of a mode-locked laser is in the sub-nanosecond range. It is not necessary to produce visible optical breakdown of a gas such as $SF_6$ or argon in the interelectrode gap to effectively trigger the spark gap.

Referring to FIG. 4, the transmission line pulse generator consists of two sections of coaxial transmission line 50 and 52 of the same characteristic impedance. A high voltage input is generated from a source, not shown, and connected through low capacitance, high voltage resistor $R_1$ to the pulse forming section 50 of the pulse generator. The first section of the line 50 is charged to a voltage $V_1$ with a time constant $R_1$, $C_1$, where $C_1$ is the total capacity of the first section of the transmission line 50. Once charged, no further current flows in resistor $R_1$ and the pulse forming section 50 is maintained at a constant potential $V_1$.

Between the pulse forming section 50 and the delay line section 52 of the transmission line pulse generator, a gap exists. The entire pulse generator is packaged within a pressurized container 54 and filled with a gas such as $SF_6$ or argon. In the gap between the two sections 50 and 52, lenses $L_1$ and $L_2$ are inserted in the container 54. The gap between the two transmission line sections is also pressurized.

If a small value of electric field strength to pressure ratio is chosen for the gap between sections 50 and 52, the gap will hold off the potential $V_1$ indefinitely. However, for very large values of electric field strength to pressure ratio, the gap will break down after a known delay time. Thus if potential $V_1$ is applied through resistor $R_1$ rapidly enough, and an optical trigger pulse applied in the gap in a time short compared to the delay of the gap for a given electric field to pressure ratio, the gap breakdown can be controlled with the optical pulse.

Once the gap is triggered, the pulse forming section 50 is electriacly connected to the delay section 52. Since the two sections of the line have the same characteristic impedance, the voltage will divide equally between the two lines and two traveling waves will be produced. One half of the voltage $V_1$ will travel to the left and the other half will travel to the right. The wave traveling to the left in the pulse forming section 50 reflects from the end of the line as though it were an open circuit because resistor $R_1$ is very large relative to the impedance of the transmission line, and its capacitance is very low.

The open circuit reflection produces another wave having a voltage $V_1/2$ traveling to the right thus leaving the line to the left of it uncharged. The pulse forming section thus supplies a voltage pulse of time duration $t_p$ equal to twice the length of the line divided by the velocity of light.

At the right hand side of the delay line 52, a resistor $R_2$, Kerr cell 56 and resistors $R_3$ and $R_4$ are positioned as shown. Windows $W_1$ and $W_2$ are placed in the walls of container 54 in alignment with Kerr cell 56.

The pulse originally started to the right in the delay section 52 continues to travel to the right until it arrives at the junction of the transmission line 52 and resistors $R_2$ and $R_4$. The values of $R_2$, $R_3$ and $R_4$ are chosen to match the Kerr cell 56 to the characteristic impedance of the transmission line. If properly matched, the transmission line will produce no reflection and a potential of $V_1/2$ will be produced across the Kerr cell 56 for the duration $t_p$ of the traveling wave. If the Kerr cell voltage for quarter wave retardation of a laser pulse is $V_1/2$, the optical path through the Kerr cell 56 will be open for a time equal to $t_p$ which is chosen to be approximately equal to the mode-locked pulse repetition period of the laser.

Output pulses from a mode-locked laser 58 are directed through a half transmitting-half reflecting mirror $M_1$ where the transmitted portion of the pulses pass through lens $L_1$ and through the gap between the two sections 50 and 52 of the transmission line. At time $t_0$, ionization is produced at the focal point of lens $L_1$ at the center of the spark gap. The laser radiation in the gap initiates a set of traveling waves at time $t_1 = t_0 + \Delta t$, where $\Delta t$ is the gap's trigger initiation delay time.

A portion of the mode-locked pulses are reflected from mirror $M_1$, and reflected from mirrors $M_2$, $M_3$, $M_4$ through polarizer P and window $W_1$. The pulses then travel through the Kerr cell 56, the window $W_2$, the quarter wave plate WP, and are reflected by mirror $M_5$ back to the polarizer P where the pulses are then reflected out of the system when the Kerr cell optical switch is closed.

Referring to FIG. 3, if the gap between sections 50 and 52 of the transmission line is triggered by pulse $t_2$, and if the optical delay mirrors $M_1$, $M_2$, $M_3$ and $M_4$ is slightly greater than the electrical delay in the transmission line pulser, each pulse in FIG. 3 except for pulse $t_2$ will be reflected outside the system. The mirror separation dimension $l$ is made adjustable so that the optical delay can be varied to accommodate any value of trigger delay time $\Delta t$.

When the Kerr cell 56 optical switch is opened by the transmission line pulse, the radiation previously reflected outside the system by polarizer P now passes directly through the polarizer and along the path $M_4$, $M_3$, $M_2$ and $M_1$ to produce an output pulse. In the case illustrated, the pulse which occurs at time $t_2$ will represent the output of the system.

FIG. 5 is basically similar to FIG. 4 and illustrates the transmission line Kerr cell pulser for selecting a high amplitude pulse from a simultaneously Q-switched and mode-locked laser. However, in this case the Kerr cell KC, Glenn-Thomson prism polarizer P' and the quarter wave plate WP' are positioned in the optical feedback path of the laser. Mirrors $M_6$ and $M_7$ form the laser feedback cavity, whereas mirrors $M_8$ and $M_9$ reflect the laser pulse through lens $L_2$ to the gap between the sections of the transmission line pulse generator.

The two end capacitors of the transmission line pulser $C_1$ and $C_2$ are charged to a voltage $V_1$. The capacitor $C_1$ maintains a voltage $V_1$ across the Kerr cell KC equal to the quarter wave retardation voltage. The laser is then excited and simultaneously Q-switched and mode-locked by the dye cell 60 as previously explained.

As the laser radiation proceeds to bounce back and forth between the reflectors, it is polarized by the prism P', converted into circular polarization by the quarter wave plate WP', polarized by an additional quarter wave retardation by the Kerr cell KC, reflected from partial mirror $M_7$, reconverted to circular polarization by the Kerr cell, and reconverted to the polarization required for transmission through the prism by the quarter wave plate WP'.

The output of the laser from mirror $M_7$ is directed to the lens $L_1$ by mirrors $M_8$ and $M_9$. Lens $L_1$ focuses the laser radiation in the center of the pressurized spark gap. When the radiation is sufficiently intense, the gap breaks down and after a delay of $t$ seconds determined by the length of the section of transmission line, both side of the Kerr cell have the same potential and thus the Kerr cell optical switch is turned off.

Radiation directed toward the prism P' from mirror $M_7$ is now rotated 90° with respect to the incoming radiation, and is thus reflected out of the optical feedback cavity of the laser by the prism P'. This coupled out radiation produces the output of the laser. The laser is then turned off and ceases to oscillate.

Another technique for energizing Kerr cell or Pockel cell for selecting one of the higher peak power subnanosecond pulses occurring in the output of a simultaneously Q-switched and mode-locked laser is shown in FIG. 6. A laser 10 such as a Brewster ended $Nd^{3+}$ doped glass rod is positioned between two 99%+ reflectivity mirrors $M_1$ and $M_2$. Typically the laser is 53 cm. long and 1.3 cm. in diameter, and mirror $M_1$ and $M_2$ are seperated by 1 meter.

A dye cell 72 is positioned inside the laser cavity to provide mode-locking and Q-switching as described previously. A polarizer 74 and a Kerr cell 76 are also placed within the optical cavity.

A Marx-Bank pulser 78 is energized by a power supply 80 and the output from the pulser energizes Kerr cell 76.

Initially the Kerr cell is unenergized, and the polarizer 74 is adjusted for maximum transmission. Zero initial voltage condition is optimum for obtaining a uniform rejection ratio across a Kerr cell aperture.

Pumping is applied to the laser to produce lasing action, and dye cell 72 acts as described as a passive modulator having a frequency equal to the reciprocal of the round trip time required for an optical pulse to traverse the distance between the two reflectors $M_1$ and $M_2$, typically 7.5 nanoseconds. This modulating action produces ultrashort pulses of light having a pulse width equal to the reciprocal of the gain line width of the laser medium, and an amplitude resembling a typical Q switch type envelope.

The leakage laser radiation from polarizer 74 is focused onto the first gap 84 of the Marx-Bank pulse generator 78 by means of lens 82. The Marx-Bank generator is shown in detail in FIG. 7. At a predetermined pulse amplitude, the laser energy focused through lens 82 to the spark gap breaks down the spark gap, thereby causing rapid successive breakdown of the remaining over-energized spark gaps 84. Each gap breakdown effectively places one of a series of 6 parallel charged capacitors in series with other capacitors. Pulse generators of this type have only approximately a 20 nanosecond delay from the initial gap breakdown to the appearance of a high voltage across the load, in this case, Kerr cell 76.

When all the gaps 84 are broken down a fast rise time, 35 volt, quarter wave voltage pulse is applied across the Kerr cell 76. With the Kerr cell energized, the polarization of the pulse is rotated 45° for each pass through the Kerr cell, and subsequently ejected out of the laser cavity by polarizer 74. The radiation ejected by polarizer 74 constitutes the laser output. The long RC time constant of the Kerr cell, Marx-Bank circuit maintains the Q of the laser cavity at a low value for sufficient time to prevent succeeding pulses from being initiated. It is also understood that avalance transistors may be utilized in place of spark gaps in the Marx-Bank. A photodetector is then utilized to detect the leakage radiation from lens 82. The signal from the photodetector is then utilized as a signal input to the Marx-Bank.

Although this invention has been shown and described with respect to the preferred embodiments thereof, it is understood that numerous changes may be made without departing from the scope of this invention, which is to be limited and defined only by the following claims.

Having thus described the preferred embodiment of our invention, what we claim as new and desire to secure by Letters Patent of the United States is:

1. Apparatus for generating a single narrow high-power laser pulse comprising
   a laser,
   reflector means positioned at each end of said laser for forming an optical feedback cavity for said laser,
   means for actuating said laser to produce a train of simultaneous Q-switched and mode-locked laser pulses,
   optical shutter means and polarizer means positioned in said optical feedback cavity in the path of the laser feedback radiation,
   means for biasing said optical shutter means to allow passage of said feedback radiation therethrough, said feedback radiation also passing through said polarizer means, a portion of said feedback radiation being leaked from said polarizer means during passage therethrough,
   a Marx-Bank pulse generator having a spark gap,
   a source of power for said Marx-Bank generator,
   means for focusing the leakage radiation from said polarizer means on said spark gap, said spark gap breaking down when said leakage radiation reaches a predetermined magnitude and producing a voltage pulse at the output of said Marx-Bank generator,
   and means for feeding said voltage pulse to said optical shutter means to vary the bias thereof, said optical shutter means thereupon changing the polarization of the laser feedback radiation passing therethrough and causing said feedback radiation to be ejected from said polarizer means.

2. Apparatus as in claim 1 in which said optical shutter means is a Kerr cell.

3. Apparatus as in claim 1 and including a dye cell in said laser feedback cavity for producing said simultaneously Q-switched and mode-locked laser pulse train.

4. Apparatus as in claim 1 in which said optical shutter means is a Pockel cell.

References Cited

UNITED STATES PATENTS 3,423,695   1/1969   Boyden _____ 350—160

OTHER REFERENCES

H. A. Heynau, Proceedings of IEEE, An Improved Mode of Kerr Cell Operation, vol. 53, No. 12, December 1965.

RICHARD MURRAY, Primary Examiner

A. J. MAYER, Assistant Examiner

U.S. Cl. X.R.

331—94.5; 350—160